United States Patent [19]

Altmann

[11] 3,747,579
[45] July 24, 1973

[54] MECHANISM FOR PRODUCING A ROTARY MOVEMENT IN A VALVE OF AN INTERNAL COMBUSTION ENGINE

[75] Inventor: Werner Altmann, Stuttgart, Germany

[73] Assignee: Daimler-Benz Aktiengesellschaft, Stuttgart-Unterturkheim, Germany

[22] Filed: Oct. 21, 1971

[21] Appl. No.: 191,409

[30] Foreign Application Priority Data
Oct. 30, 1970   Germany .................. P 20 53 325.9

[52] U.S. Cl. ............................. 123/90.3, 251/337
[51] Int. Cl. ......................... F01l 1/32, F16k 29/00
[58] Field of Search .................... 123/90.28, 90.29, 123/90.3; 251/337

[56] References Cited
UNITED STATES PATENTS
2,827,886   3/1958   Geer .................................. 123/90.3
2,686,508   8/1954   Ralston ............................ 123/90.3
2,758,583   8/1956   Norton .............................. 123/90.3
3,564,579   2/1971   Meacham et al. ................. 123/90.3

Primary Examiner—Al Lawrence Smith
Attorney—Craig, Antonelli & Hill

[57] ABSTRACT

A mechanism for producing a rotary movement at a valve of an internal combustion engine which essentially consists of a non-rotating and of a rotatable part, of a cup-spring arranged between these two parts and of balls running on inclined surfaces whereby the inclined surfaces are arranged between the non-rotatable and rotatable parts at the latter and the cup spring is supported at the rotatable part by way of a large number of balls.

9 Claims, 3 Drawing Figures

MECHANISM FOR PRODUCING A ROTARY MOVEMENT IN A VALVE OF AN INTERNAL COMBUSTION ENGINE

The present invention relates to a mechanism for producing a rotary movement in a valve of an internal combustion engine, which essentially consists of a non-rotating and of a rotating part, of a cup spring arranged between these two parts and of balls running on inclined surfaces.

The present invention is concerned with the task to so improve a mechanism of this type that the rotary movement takes place during the closing of the valve, that the balls running on the inclined surfaces are relieved from the full spring force and that a slight structural height is achieved.

The underlying problems are solved according to the present invention in that the inclined tracks or surfaces for the balls are arranged between the non-rotating and rotating parts of the mechanism at the rotatable part and the cup spring is supported at the rotatable part by way of a large number of balls.

It is achieved by the arrangement in accordance with the present invention that the rotary movement takes place when the valve closes. As a result thereof, soot and/or dust particles adhering to the valve seat are pushed away thereby. Furthermore, it is achieved thereby that the full spring force no longer acts exclusively on the small number of balls on the inclined tracks which as a rule is relatively small, but rather is distributed over a large number of additional balls. Only the difference between the forces stemming from the valve spring or springs and the cup spring now acts on the balls on the inclined surfaces.

A small structural height for the entire mechanism can be achieved if, according to a further feature of the present invention, both the non-rotatable as also the rotatable parts of the mechanism consist of stamped-out parts. With an arrangement at a valve with two concentric valve springs, one arranged within the other, the rotatable part may thereby consist of two stampings, of which one stamped-out part is provided for the support of the outer valve spring, radially inwardly thereof with the inclined surfaces or tracks for the balls between the non-rotating and the rotatable part and radially outwardly thereof with a running surface or track for the balls, at which is supported the cup spring, and the other stamped-out part for the support of the inner valve spring is supported at the first stamped-out part intermediate the inclined surfaces and the running surface.

Accordingly, it is an object of the present invention to provide a mechanism for producing a rotary movement in a valve of an internal combustion engine which avoids by simple means the aforementioned shortcomings and drawbacks encountered in the prior art.

Another object of the present invention resides in a mechanism for producing a rotary movement at a valve of an internal combustion engine in which the rotary movement takes place during the closing of the valve.

A further object of the present invention resides in a mechanism of the aforementioned type which has a self-cleaning action and favorable stress distribution.

Still a further object of the present invention resides in a mechanism for producing a rotary movement at a valve of an internal combustion engine in which balls moving along inclined cam tracks, are relieved from the the full spring force of the valve-actuating springs.

Another object of the present invention resides in a mechanism of the aforementioned type which not only distinguishes itself by better stress distribution but also by a smaller structural height.

These and other objects, features, and advantages of the present invention will become more apparent from the following description when taken in connection with the accompanying drawing which shows, for purposes of illustration only, one embodiment in accordance with the present invention, and wherein.

Figure 1:
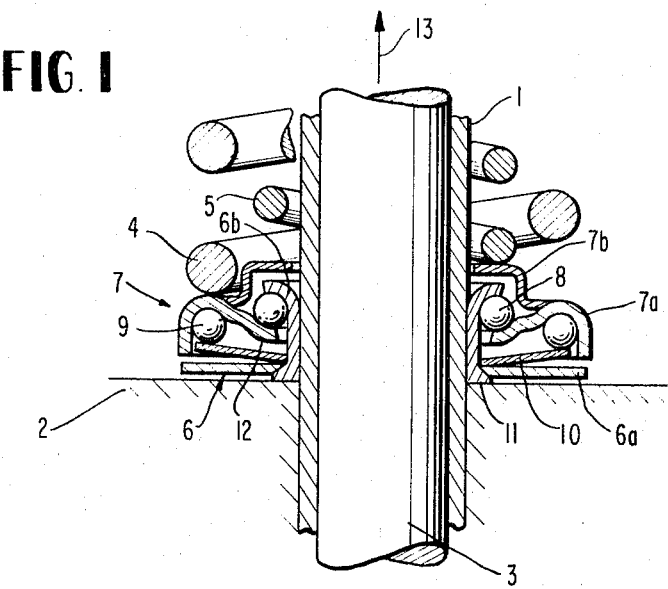
FIG. 1 is a longitudinal cross-sectional view through a mechanism for producing a rotary movement at a valve of an internal combustion engine in accordance with the present invention.

Referring now to the drawing wherein like reference numerals are used throughout the various views to designate like parts, and more particularly to FIG. 1, the mechanism for producing a rotary movement during the closing operation of a valve of an internal combustion engine, of which only the valve stem 3 guided in a valve guide 1 within a cylinder head 2 and the valve springs 4 and 5 are shown, essentially consists of a non-rotatable part generally designated by reference numeral 6 and supported at the cylinder head 2, of a rotatable part generally designated by reference numeral 7 and supported at the valve springs 4 and 5, of five balls 8, of a ring of about 30 balls 9, and of a cup spring 10.

The non-rotatable part 6 consists of two stamped-out members 6a and 6b whereby the stamping 6a is disposed as a ring above the cylinder head 2 and the stamping 6b is arranged cylindrically about the valve guide 1 and forms with its upper portion a running surface or track for the balls 8. The stamping 6b rests with eight pressed-out webs 11 on the cylinder head 2.

Figure 2:
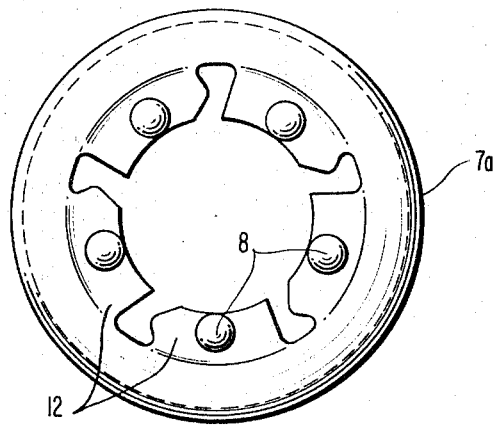
FIG. 2 is a plan view of the rotatable part of the mechanism in accordance with the present invention, provided with the inclined surfaces.
Figure 3:
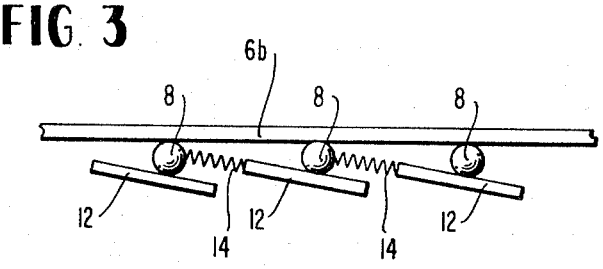
FIG. 3 is a schematic view illustrating the position of the balls between the non-rotating and the rotatable part of the mechanism in accordance with the present invention.

The rotatable part 7 also consists of two stamped-out members 7a and 7b. The stamping 7a thereby forms a running surface or track for the balls 9 which are pressed against the stamping 7a, by the cup spring 10 supporting itself at the stamping 6a and which further forms, as can be seen more clearly from FIGS. 2 and 3, radially inwardly of the runningsurface for the balls 9, inclined surfaces or tracks 12 for the balls 8. The stamping 7b is disposed above the stamping 6b and abuts at the stamping 7a within the area between the two running surfaces for the balls 8 and 9. The valve spring 4 is supported at the stamping 7a, and also partially on the stamping 7b which serves for the support of the valve spring 5.

The illustrated mechanism rotates the valve by way of the valve springs 4 and 5 and the valve stem 3 when the valve closes, i.e., when it moves in the direction of arrow 13 (FIG. 1). Impairing soot or dust particles at the valve seat are thereby pushed away. The balls 8 are pressed in one direction by the springs 14 (FIG. 3) which are supported at the inclined surfaces or tracks 12 of the stamping 7a.

The force of the valve springs 4 and 5 no longer passes over only onto the balls 8 but also onto the balls 9. Since a large number of balls 9 are provided, the cup spring 10 is not pounded in by the balls 9. The balls 8 on the inclined surfaces 12 only receive the differential force of the valve springs 4, 5 and the cup spring 10.

The over-all structural height of the mechanism becomes very small by the use of stamped-out parts. The structural height of the internal combustion engine is practically not influenced and the valve mass is hardly increased. The mechanism can be manufactured in an inexpensive manner.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim

1. A mechanism for producing a rotary movement at a valve of an internal combustion engine which has concentrically arranged valve springs, which includes a non-rotatable and a rotatable part, a cup spring arranged between these two parts, and balls running on inclined surface means of one of said two parts, characterized in that the inclined surface means are provided between the non-rotatable and rotatable parts at the rotatable part, in that the cup spring is supported at the rotatable part by way of a large number of further balls, and in that the rotatable part consists of two stamped-out members, of which one stamped-out member supporting the outer valve spring, is provided radially inward thereof with the inclined surface means for the balls between the non-rotatable part and the rotatable part and radially outward thereof with running surface means for the further balls, and the other stamped-out member of the rotatable part supporting the inner valve spring, is supported at the first-mentioned stamped-out part intermediate the inclined surface means and the running surface means.

2. A mechanism according to claim 1, characterized in that the non-rotatable part as also the rotatable part each consists of several stampings.

3. A mechanism according to claim 2, characterized in that the non-rotatable part also consists of two stamped-out members, one of said last-mentioned stamped-out members being disposed as ring above the cylinder head and the other stamped-out member being arranged cylindrically about a valve guide means.

4. A mechanism according to claim 1, characterized in that the non-rotatable part also consists of two stamped-out members, one of said last-mentioned stamped-out members being disposed as ring above the cylinder head and the other stamped-out member being arranged cylindrically about a valve guide means.

5. An arrangement for producing rotation of a valve on an internal combustion engine comprising:

a non-rotatable part, a rotatable part movable with a valve stem of a valve, cup spring means interposed between said rotatable and non-rotatable parts, inclined surface means on one of said rotatable and non-rotatable parts, a first set of balls positioned between said rotatable and non-rotatable parts in engagement with said inclined surface means, a second set of balls positioned between said cup spring means and one of said rotatable and non-rotatable parts, running surface means on one of said rotatable and non-rotatable parts for guidingly engaging said second set of balls, and first and second valve return springs arranged concentrically around said stem, both of said return springs being supported at one of said rotatable and non-rotatable parts, said first return spring being supported at said one part at a position radially outwardly of said inclined surface means and said second return spring being supported at said one part at a position radially inwardly of the first return spring and the running surface means.

6. An arrangement according to claim 5, wherein both said running surface means and said inclined surface means are on said one part.

7. An arrangement according to claim 6, wherein said one part is said rotatable part.

8. An arrangement according to claim 7, wherein said rotatable part consists of two stamped-out members, one of said members supporting said first return spring and including said running and inclined surface means, the other of said members supporting the second return spring.

9. An arrangement according to claim 8, characterized in that the non-rotatable part also consists of two stamped-out members, one of said last-mentioned stamped-out members being disposed as ring above the cylinder head and the other stamped-out member being arranged cylindrically about a valve guide means.

* * * * *